US007530617B2

(12) United States Patent
Kirner

(10) Patent No.: US 7,530,617 B2
(45) Date of Patent: May 12, 2009

(54) ADAPTER SYSTEM

(75) Inventor: Herbert Kirner, Villingen-Schwenningen (DE)

(73) Assignee: Siemens Aktiengesellschaft, Munich (DE)

( * ) Notice: Subject to any disclaimer, the term of this patent is extended or adjusted under 35 U.S.C. 154(b) by 532 days.

(21) Appl. No.: 10/596,302

(22) PCT Filed: Nov. 9, 2004

(86) PCT No.: PCT/US2004/052878

§ 371 (c)(1), (2), (4) Date: Jun. 8, 2006

(87) PCT Pub. No.: WO2005/056339

PCT Pub. Date: Jun. 23, 2005

(65) Prior Publication Data

US 2007/0063110 A1 Mar. 22, 2007

(30) Foreign Application Priority Data

Dec. 10, 2003 (DE) ................................ 103 57 799

(51) Int. Cl.
*B60N 3/12* (2006.01)

(52) U.S. Cl. .................................................. 296/37.12

(58) Field of Classification Search ............... 296/37.12
See application file for complete search history.

(56) References Cited

U.S. PATENT DOCUMENTS 3,305,203 A * 2/1967 Williams, Jr. ............... 248/201
3,994,148 A * 11/1976 Anderson ...................... 70/58
4,169,624 A * 10/1979 Yefsky et al. ............ 296/37.12
4,462,564 A * 7/1984 Alves et al. ................ 248/27.1
4,895,326 A * 1/1990 Nimpoeno et al. ......... 248/27.1
5,020,151 A * 5/1991 Sampei et al. .............. 455/345
5,132,958 A * 7/1992 Camps et al. ............... 720/689
5,280,865 A * 1/1994 Van Hout et al. ........... 248/27.1
5,359,587 A * 10/1994 Uehara ........................ 720/600
5,381,684 A * 1/1995 Kawamura ..................... 70/58
5,595,430 A 1/1997 Weyeneth ................ 312/319.1
5,779,197 A * 7/1998 Kim .......................... 248/27.1

(Continued)

FOREIGN PATENT DOCUMENTS

DE 3824301 A1 7/1988

(Continued)

OTHER PUBLICATIONS

International Search Report and Written Opinion; PCT/EP2004/052878; 15 Pgs., Feb. 2, 2005.

*Primary Examiner*—Kiran B. Patel
(74) *Attorney, Agent, or Firm*—King & Spalding LLP

(57) ABSTRACT

An adapter system for mounting a built-in device (7) in an installation space (1) in accordance with DIN ISO 7736 compensates for vertical and horizontal play between the installation space (1) and the built-in device (7). Previously known solutions have the common disadvantage that the production and storage of the adapter system imply high costs, plays are not adequately compensated for, vibrations are insufficiently dampened and assembly is complicated. These disadvantages are solved in that the adapter system has at least two separate partial elements (15) which embrace the built-in device (7) on two opposite sides in an U-shaped manner. Hence, the disadvantages encountered in prior art with respect to high costs and the high emergence of vibrations and simplifies assembly are solved.

14 Claims, 7 Drawing Sheets

U.S. PATENT DOCUMENTS 5,971,461 A * 10/1999 Vaishnav et al. ......... 296/37.12
6,283,417 B1 9/2001 Ikunami .................... 248/27.3

FOREIGN PATENT DOCUMENTS

DE 69604216 T2 3/1996
EP 0734903 B1 3/1996
EP 1000808 A1 5/1998

* cited by examiner 83
8
30
15
29
7
81
80
46
46
82
30
26
22
27
24
31
15
21
23
29
25
28
32
41
41

ADAPTER SYSTEM

CROSS-REFERENCE TO RELATED APPLICATIONS

This application is a U.S. national stage application of International Application No. PCT/EP2004/052878 filed Nov. 9, 2004, which designates the United States of America, and claims priority to German application number DE 103 57 799.8 filed Dec. 10, 2003, the contents of which are hereby incorporated by reference in their entirety.

TECHNICAL FIELD

The invention relates to an adapter system for installing a built-in device in an installation space, in particular an installation space for a built-in device, which is provided for front installation, with an upper side, lower side, left side and right side, in a motor vehicle, with compensating elements which are arranged between boundary surfaces of the installation space and the built-in device, and which compensate for the vertical play between first boundary surfaces bounding the installation space vertically and the built-in device, and which compensate for the horizontal play between second boundary surfaces bounding the installation space widthwise and the built-in device.

BACKGROUND

Adapter systems of this type are used nowadays in virtually every motor vehicle for the installation of the car radio. The dimensions of the installation space are usually oriented in this case to DIN ISO 7736 which also proposes possibilities for fastening the built-in device in the installation space. A “front fastening” and a “lateral fastening” are preferred, in which elastically resilient projections, which are provided in each case at regular intervals on the adapter system, latch into recesses, which correspond thereto, on the surfaces bounding the installation space. In addition, a rear fastening can take place by means of a threaded bolt. The new digital generation of tachographs is no longer, like the mechanical predecessors, accommodated in a round installation form in the motor vehicle but rather in an installation space according to the abovementioned standard. Firstly, known adapter systems for the installation in installation spaces of this type, in particular for car radios, are complicated and cost-intensive to produce as a punched and bent part due to the dimensions and tolerances and, in addition, are only of limited suitability for the mounting of the complicated and sensitive tachographs. Furthermore, due to the dimensions of the device, the installation of the digital tachograph by means of a known adapter system would render the rear fastening, which is actually optional, indispensable, thus unduly increasing the outlay of assembly.

SUMMARY

The invention has therefore made it the object to provide an adapter system which, in particular, permits the installation of built-in devices in the installation space described by DIN ISO 7736 with the dimensional differences between the installation space and the built-in device being reliably compensated for, with a simultaneously minimized outlay on production and assembly and a particularly high degree of stability.

To achieve the object, the invention proposes an adapter system of the type mentioned at the beginning, in which the adapter system comprises at least two separate partial elements, the compensating elements are part of the partial elements, the two partial elements are arranged on two opposite sides of the built-in device, and each partial element embraces the built-in device in a U-shaped manner.

A decisive advantage of the adapter system according to the invention resides in dividing it into two separate partial elements, as a result of which the two partial elements independently of each other can bridge the respective play between the built-in device and the installation space. In this manner, any forces from the one partial element are not unfavorably transmitted to the opposite side of the other partial element, with the result that even large joining forces, as frequently occur in the prior art, do not lead to the deformation or even distortion of the built-in device or of the installation space. In addition, the adapter system, comprising the two partial elements, can be of substantially smaller design than previous adapter systems which usually have the dimensions of the built-in device. According to the invention, an optimization of the compensating elements of the partial elements to certain installation situations can already take place at the factory, and the partial elements can already be fitted to the built-in device before delivery to the customers.

The adapter system according to the invention can provide additional security against vibrations resulting from undesired play if each partial element embraces the built-in device in a U-shaped manner touching it on at least three sides. Since the built-in devices according to the abovementioned standard are designed as flat cuboids, it is expedient if each of the two partial elements embraces the built-in device on one of the two lateral sides while touching the upper side and the lower side.

So that every degree of freedom of undesired movement is taken from the built-in device, it is expedient if the compensating elements on the partial elements have bearing regions which bear against the bearing surfaces of the installation space and against a side of the built-in device and compensate for the play there between the built-in device and the installation space, specifically in each case at least one lateral bearing region for bearing against a lateral boundary surface, in each case at least one upper bearing region for bearing against an upper boundary surface and in each case at least one lower bearing region for bearing against a lower boundary surface. The built-in device obtains further stabilization, in particular against undesired rotational movements if, in the depth direction of the built-in device, the partial elements in each case have two consecutively arranged lateral, upper and/or lower bearing regions and/or compensating elements.

A play-free mounting can advantageously be achieved by the compensating elements being of elastic design at least partly in their extent between the boundary surface of the installation space and the side of the built-in device. In this manner, a damping of undesirable vibrations can additionally be achieved. In the case of an elastic design of the compensating elements, the gradation of different plays between the built-in devices and the installation space can be dimensioned more roughly in terms of size, with the result that the bearing outlay is considerably reduced.

A particularly simple installation of the partial elements arises if the partial elements engage in an elastically resilient manner around the built-in device. Comparable results can be obtained if the partial elements are latched, flanged or riveted to the built-in device. Manufacturing costs and outlay on manufacturing are considerably reduced if the partial elements are made from plastic. In addition, plastic has excellent damping properties, in particular in comparison to metal.

The adapter system according to the invention can advantageously be combined with a commercially available and much tried and tested fastening element by means of which the built-in device can be secured in the installation space. For this purpose, a commercially available fastening element can be fitted in each case, for example by means of a screw or latching connection, to in each case one partial element according to the invention of the adapter system, which partial element is to be fitted on one side. In this case, it is also conceivable for the partial element to be formed integrally with the corresponding fastening element, for example to be injection-molded onto the fastening element, which is generally formed from metal. The partial element may advantageously also be formed integrally with the fastening element as a metallic punched and bent part.

A particularly error-free installation and a reduced bearing outlay arise if the partial elements are formed symmetrically with respect to a depth plane of the installation space, so that the forwardly pointing half is formed mirror-symmetrically to the half pointing into the depth of the installation space. In this manner, partial elements to be fitted on the one side can be formed identically with those partial elements which are situated on the opposite side. Damage-free installation is substantially facilitated if each partial element is provided with an introducing slope on the edges leading in the depth direction of the installation space.

BRIEF DESCRIPTION OF THE DRAWINGS

The invention is described in more detail below using exemplary embodiments with reference to drawings for clarification purposes. For a person skilled in the art, further embodiment possibilities emerge from the invention. In the drawings.

DETAILED DESCRIPTION

Figure 1:
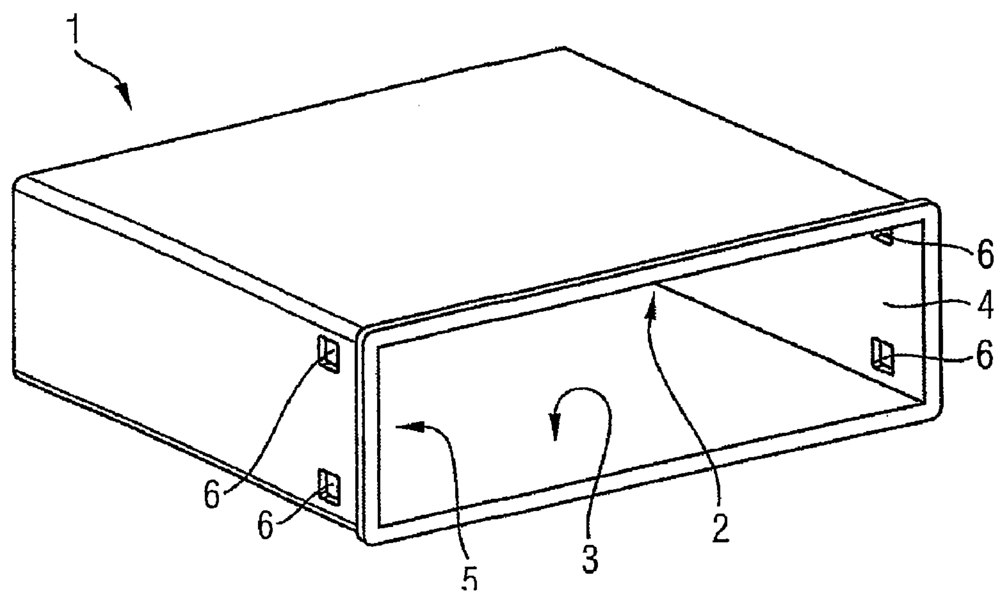
FIG. 1 shows a perspective illustration of an installation space according to DIN ISO 7736.

FIG. 1 shows an installation space 1 as provided by DIN ISO 7736, for receiving front installation devices. The installation space 1 has an upper boundary surface 2, a lower boundary surface 3, a right lateral boundary surface 4 and a left lateral boundary surface 5. On the input side, the left lateral boundary surface 5 and the right lateral boundary surface 4 are provided with in each case two openings 6 for fastening elements (not illustrated).

Figure 2:
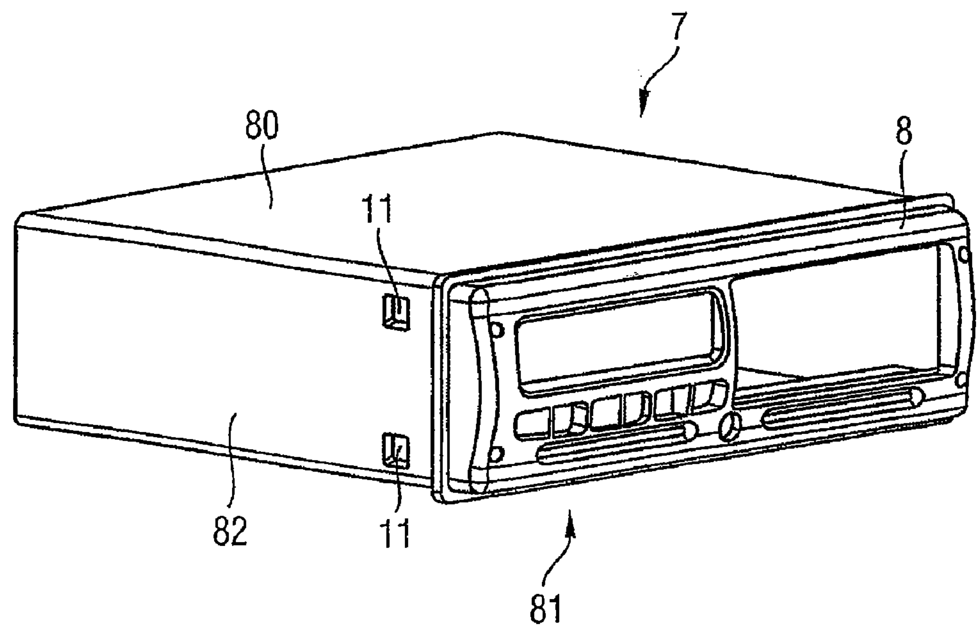
FIG. 2 shows a perspective illustration of a built-in device from the view from the front.
Figure 3:
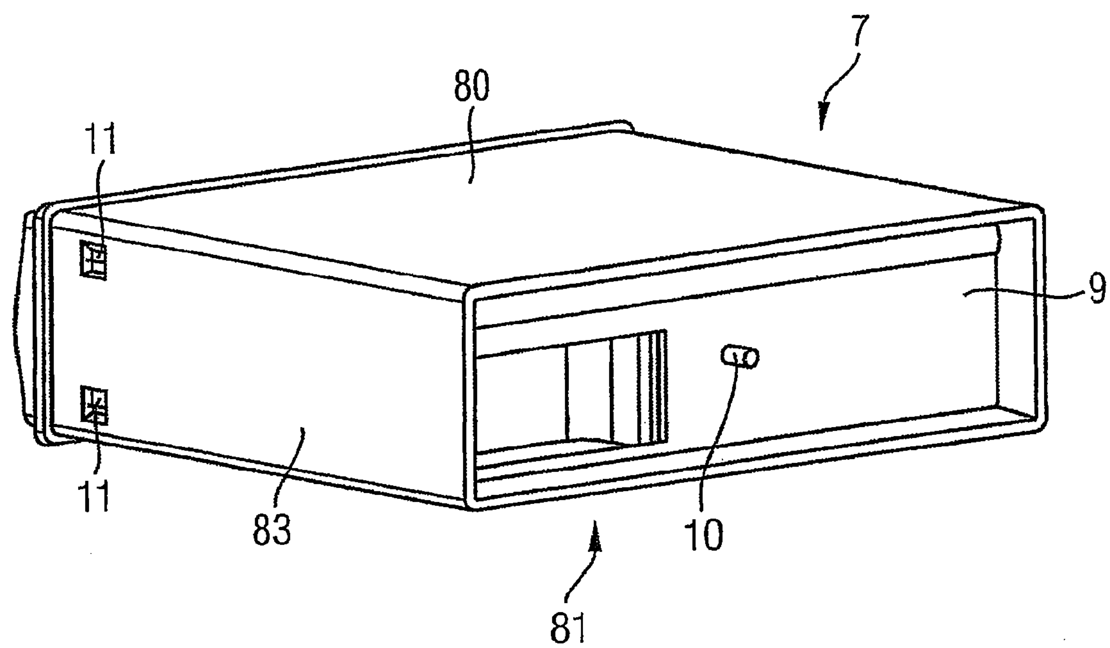
FIG. 3 shows a perspective illustration of a built-in device from the view from the rear.

FIGS. 2 and 3 respectively show perspectively a built-in device from the view from the front and from the view from the rear. On the front side, the built-in device 7 has a front panel 8 which is provided with various functional elements (not illustrated here). Adjoining the front panel 8 at right angles are an upper side 80, lower side 81, left side 82 and a right side 83 which, together with a rear side 9, define the cuboidal outer contour of the built-in device. The rear side 9 of the built-in device 7, which side is situated opposite the front panel 8, has in the center a threaded bolt 10 for fastening to an opening provided according to DIN ISO 7736. Corresponding to the openings 6 on the installation space 1, the built-in device 7 is provided with recesses 11 on the left side 82 and on the right side 83.

Figure 4:
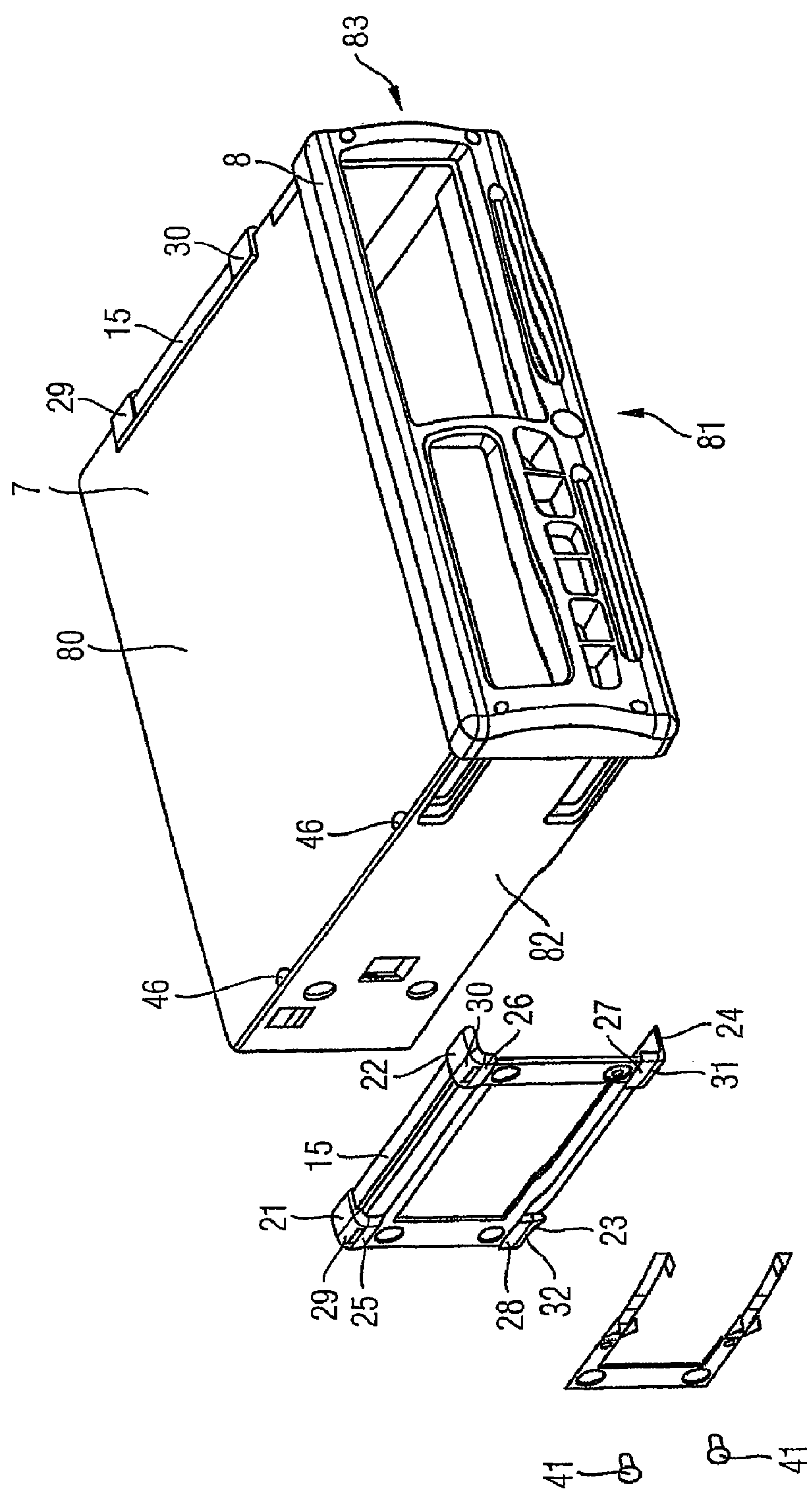
FIG. 4 shows a perspective exploded illustration of a built-in device with a partial element of an adapter system according to the invention and a fastening element.
Figure 5:
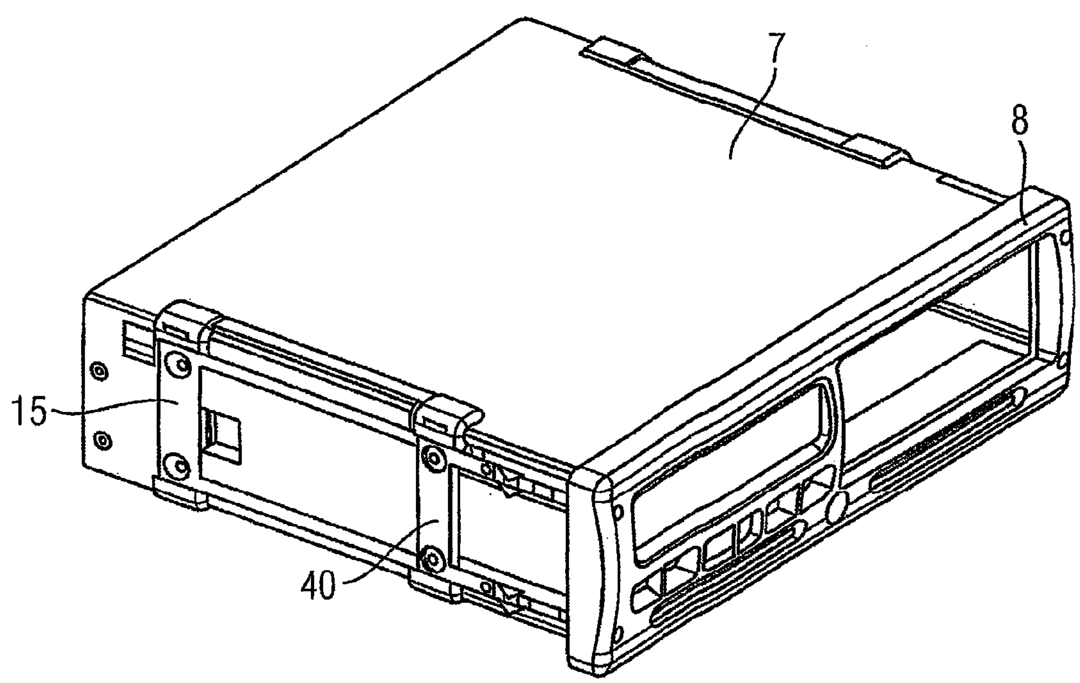
FIG. 5 shows a perspective combination of a built-in device with a fitted adapter system according to the invention, FIGS. 6, 7 each show a perspective illustration of a partial element of an adapter system according to the invention, FIGS. 8, 9 each show a perspective illustration of a second embodiment of a partial element of an adapter system according to the invention.
Figure 6:
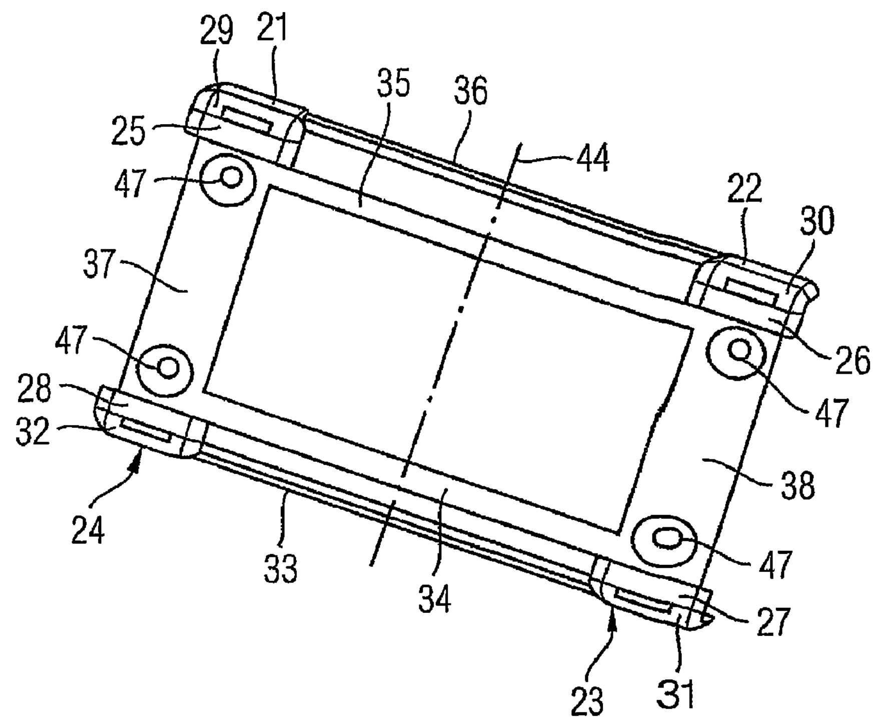
Figure 7:
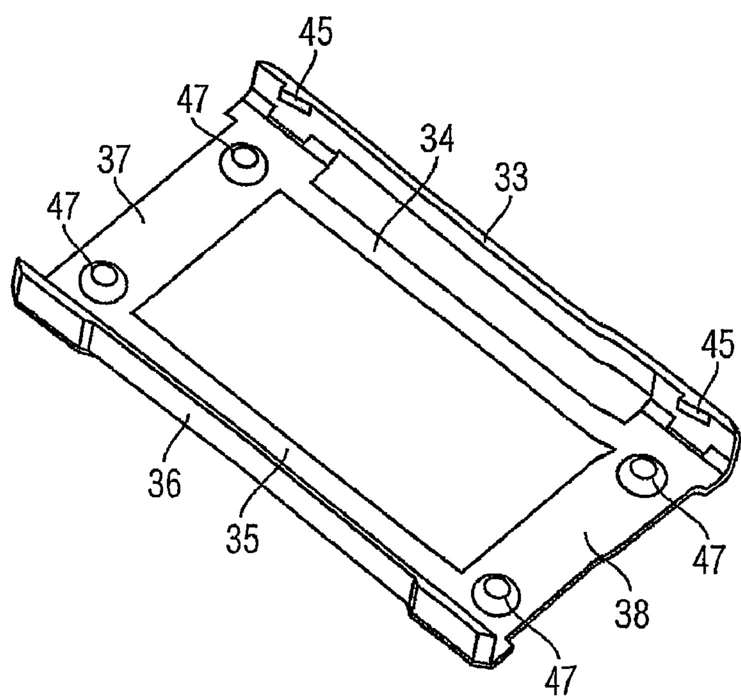

FIG. 4 shows how partial elements 15 according to the invention are fitted on two opposite sides, the left side 82 and the right side 83 of the built-in device 7. Each partial element 15 embraces the built-in device 7 on the particular side 82, 83 while touching the side 82, 83 and the upper side 80 and lower side 81 bordering it at right angles. The partial element 15 touches the built-in device 7 on the respective sides 80, 81, 82, 83 with a compensating element 29, 30, 31, 32 in a bearing region 21-28. Each of the two partial elements 15, as can also be seen from FIGS. 6, 7, has two upwardly pointing bearing regions 21, 22, two downwardly pointing bearing regions 23, 24 and four lateral bearing regions 25-28, with in each case an upper bearing region 21, 22 or lower bearing region 23, 24 together with a lateral bearing region 25-28 being part of one of four compensating elements 29-32. The compensating elements 29-32 are positioned in each case in an L-shaped manner around an edge of the built-in device 7 and are connected to one another, in each case forming a partial element 15, by means of horizontal webs 33-36 and vertical webs 37, 38.

The partial elements 15 according to the embodiment of the invention illustrated in FIG. 4 are fastened together with a commercially available fastening element 40 to the built-in device 7 by means of screws 41. The compensating elements 29-32 are designed in their dimensions in such a manner that their thickness bridges the play between the built-in device 7 and the installation space 1 in total both horizontally and vertically. The connection of the compensating elements 29-32 by means of the webs 33-38 ensures that the compensating elements 29-32 are situated in two different depth planes 42, 43, with the result that undesired degrees of freedom in the rotation of the built-in device 7 in the installation space 1 are avoided. The partial elements 15 are of identical design for both sides of the built-in device 7 and are mirror-symmetrical to a central depth plane 44 of the partial elements 15. For fastening to the built-in device 7, the partial elements 15 are provided with latching lugs 45 which are designed such that they can latch into recesses 46 of the built-in device 7. Holes 47 in the partial elements 15 serve to fasten the fastening element 40 to the partial element 15 with simultaneous fastening to the built-in device 7.

Figure 8:
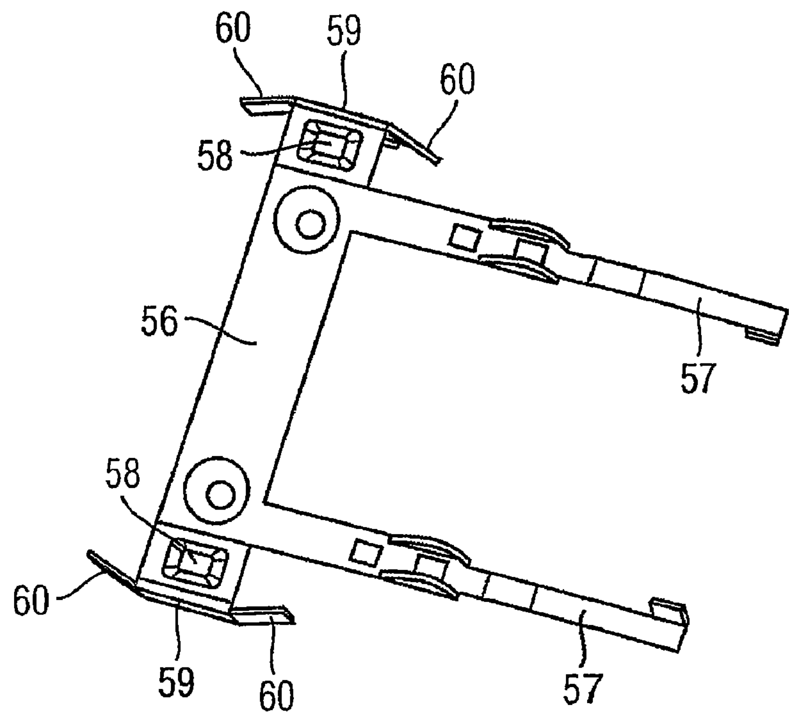
Figure 9:
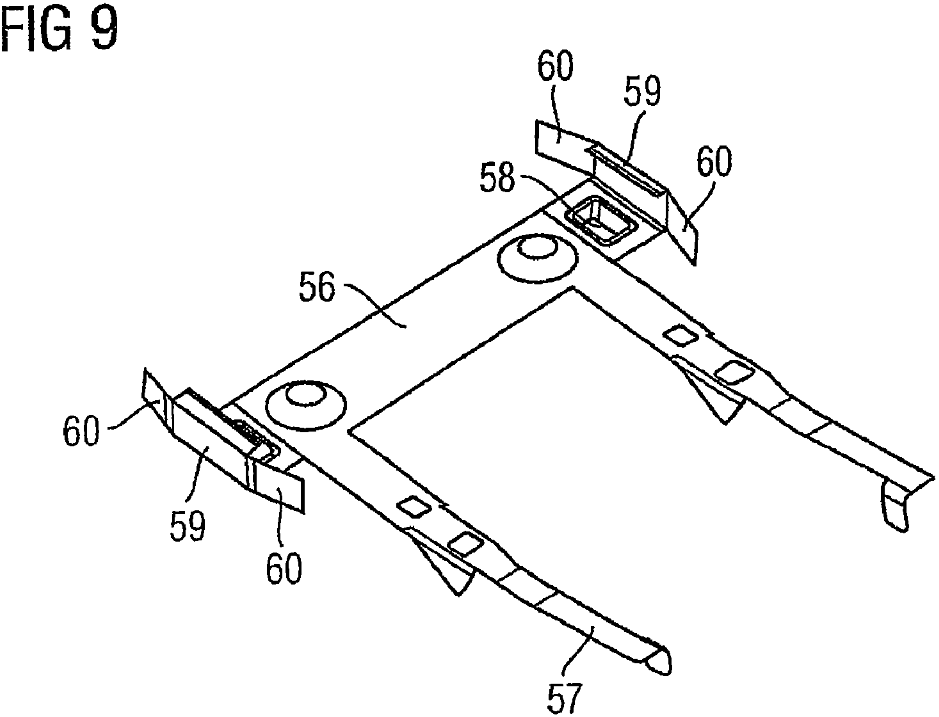
Figure 10:
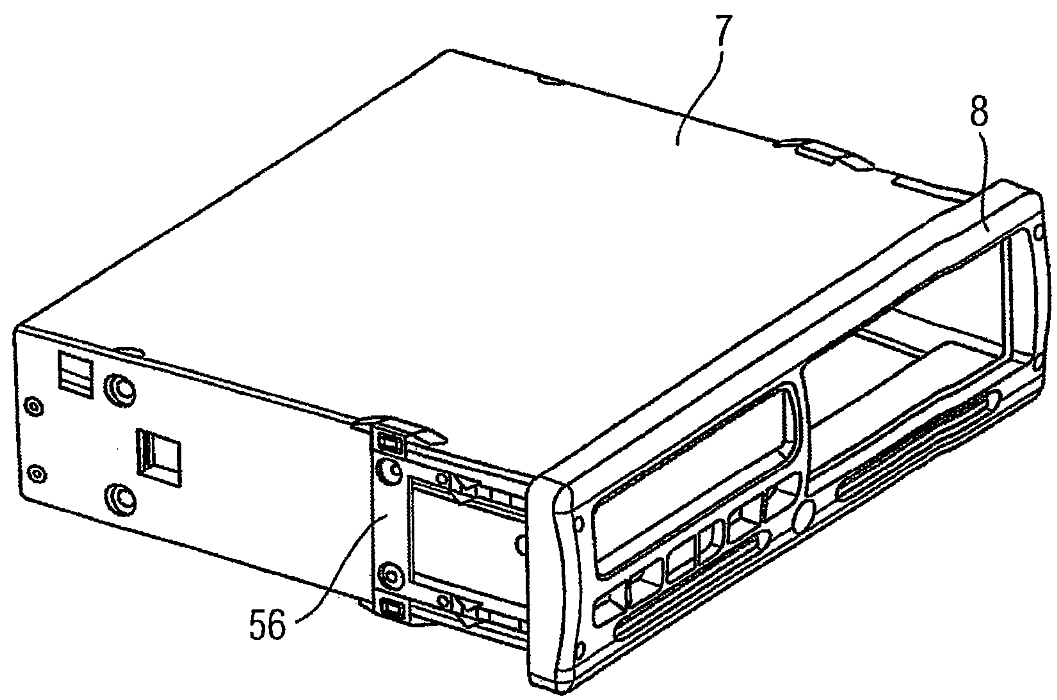
FIG. 10 shows a perspective combination of a built-in device with an adapter system according to the invention in the manner of the second embodiment.

FIGS. 8, 9 and 10 show a second embodiment of a partial element 56 integrally with a fastening element 57. Lateral compensating elements 58 bridge the horizontal play of the built-in device 7 with respect to the installation space 1 and upper and lower compensating elements 59, 60 bridge the vertical play. These metallic partial elements 56 are provided with introducing slopes 60 for easier installation and removal.

What is claimed is:

1. An adapter system for installing a built-in device in an installation space, the installation space being provided for front installation, in a motor vehicle, comprising at least two separate partial elements which are arranged on two opposite sides of the built-in device and embrace the built-in device in a U-shaped manner, respectively and compensating elements which are part of the partial elements and which compensate for the vertical play between the first boundary surfaces bounding the installation space vertically and the built-in device and compensate for the horizontal play between second boundary surfaces bounding the installation space widthwise and the built in device, wherein the compensating elements each have an upper bearing region together with a lateral bearing region and or a lower bearing region together with a lateral bearing region, the each compensating elements being positioned in an L-shaped manner around an respective edge of the built-in device, respectively and the upper or lower bearing region serving for bearing against one of the first boundary surfaces and the lateral bearing region serving for bearing against one of the second boundary surfaces and the compensating elements being designed in their dimensions in such a manner that their thickness spans the play between the built-in device and the installation space in total both horizontally and vertically.

2. An adapter system according to claim 1, wherein each partial element embraces the built-in device in a U-shaped manner touching it on at least three sides.

3. An adapter system according to claim 1, wherein each of the at least two partial elements embraces the built-in device on one of the two lateral sides while touching the upper side and the lower side.

4. An adapter system according to claim 1, wherein the compensating elements are connected to one another, forming a partial element, respectively by means of horizontal webs and vertical webs.

5. An adapter system according to claim 1, wherein the compensating elements are of elastic design at least partly in their extent between the boundary surface of the installation space and the side of the built-in device.

6. An adapter system according to claim 1, wherein the partial elements engage in an elastically resilient manner around the built-in device.

7. An adapter system according to claim 1, wherein the partial elements are latched, flanged or riveted to the built-in device.

8. An adapter system according to claim 1, wherein, in the depth direction of the built-in device, the partial elements have two consecutively arranged lateral, upper and lower bearing regions, respectively.

9. An adapter system according to claim 1, wherein the partial elements are made from plastic.

10. An adapter system according to claim 1, wherein the partial elements are made from metal.

11. An adapter system according to claim 1, wherein the partial elements are in each case connected to a fastening element by means of which the built-in device is secured in the installation space.

12. An adapter system according to claim 1, wherein the fastening element is formed integrally with the partial element.

13. An adapter system according to claim 1, wherein the partial elements are formed symmetrically with respect to a depth plane of the installation space, so that the forwardly pointing half is formed mirror-symmetrically to the half pointing into the depth of the installation space.

14. An adapter system according to claim 1, wherein each partial elements is provided with introducing slopes on the edges leading in the depth direction of the installation space.

* * * * *